United States Patent [19]

Wimbush

[11] Patent Number: 4,506,507
[45] Date of Patent: Mar. 26, 1985

[54] RESERVOIRS FOR LIQUID PRESSURE CONTROL SYSTEMS

[75] Inventor: Maurice J. Wimbush, Leamington Spa, England

[73] Assignee: Automotive Products plc, Leamington Spa, England

[21] Appl. No.: 599,248

[22] Filed: Apr. 11, 1984

Related U.S. Application Data

[63] Continuation of Ser. No. 338,165, Jan. 8, 1982, abandoned.

[30] Foreign Application Priority Data

Jan. 21, 1981 [GB] United Kingdom ............... 8101849

[51] Int. Cl.³ ................................................ B60T 11/26
[52] U.S. Cl. ........................................ 60/584; 60/585; 60/592; 137/854; 188/352; 303/64
[58] Field of Search .................. 188/352; 137/852, 854; 303/64; 60/584, 585, 586, 587, 592

[56] References Cited

U.S. PATENT DOCUMENTS

| | | | |
|---|---|---|---|
| 2,077,908 | 4/1937 | Tatter | 60/584 |
| 2,580,851 | 11/1948 | Seppmann | 60/585 |
| 2,959,010 | 11/1960 | Broden | 60/584 |
| 3,423,939 | 1/1969 | Lewis et al. | 137/852 |
| 3,454,182 | 7/1969 | Morton | 137/854 |
| 3,522,705 | 8/1970 | Wienecke | 60/587 |
| 4,017,329 | 4/1977 | Larson | 188/352 |

FOREIGN PATENT DOCUMENTS

| | | |
|---|---|---|
| 1231449 | 5/1971 | United Kingdom . |
| 1437408 | 5/1976 | United Kingdom . |
| 1539879 | 2/1979 | United Kingdom . |
| 1548669 | 7/1979 | United Kingdom . |

*Primary Examiner*—Robert E. Garrett
*Assistant Examiner*—Richard S. Meyer
*Attorney, Agent, or Firm*—Hauke and Patalidis

[57] ABSTRACT

A liquid reservoir for a hydraulic master cylinder, having a body with a detachable cap for refilling the reservoir, and a diaphragm secured in position by the cap and dividing the reservoir into an air chamber, vented to atmosphere via a hole in the cap and a liquid chamber connected to the master cylinder. An inlet port is provided in the wall of the reservoir for initial charging of the liquid into the liquid chamber without removal of the cap, the port being closed by a plug after the liquid reservoir has been filled. The method of filling a hydraulic control system which has such a reservoir is by the application of vacuum to the system via the inlet port, introducing liquid into the system through the port and subsequently sealing the port with the plug.

4 Claims, 3 Drawing Figures

4,506,507

RESERVOIRS FOR LIQUID PRESSURE CONTROL SYSTEMS

CROSS-REFERENCE TO RELATED APPLICATIONS

This application is a continuation of application Ser. No. 338,165, filed Jan. 8, 1982, and assigned to the same assignee as the present application, now abandoned, and is related to application Ser. No. 599,249, filed Apr. 11, 1984.

This invention relates to reservoirs for liquid pressure control systems in which a master cylinder is operated to produce a working displacement of a piston in a remote slave cylinder connected thereto by a conduit. The invention is particularly concerned with reservoirs for such systems that are utilized to produce a displacement for the operation of a motor vehicle friction clutch.

In British Pat. No. 1 539 879 is described a motor vehicle clutch hydraulic control system comprising a hydraulic master cylinder, a reservoir for the master cylinder and a remote hydraulic slave cylinder connected to the master cylinder via a conduit. In order to simplify installation of the control system onto the vehicle the above specification proposes that the control system is assembled, filled with hydraulic fluid and bled before fitting to the vehicle. In the above specification, especially FIGS. 7 to 10, is illustrated a reservoir having a bellows diaphragm located in the reservoir cap to divide the reservoir into an air chamber vented to atmosphere through the cap, and a liquid chamber connected to the master cylinder. In the above reservoir the cap and diaphragm are removed from the reservoir to enable the system to be filled with liquid at the reservoir and bled, at the slave cylinder. Once the filling and bleeding operation has been concluded the diaphragm is inserted into the reservoir.

The removal and replacement of the reservoir cap and diaphragm is time consuming and the replacement can be messy when the reservoir is full of fluid, and total exclusion of air from the system cannot be guaranteed.

SUMMARY OF THE INVENTION

Accordingly there is provided a reservoir for a liquid pressure control system and comprising a reservoir body having a detachable cap for re-charging the reservoir, a diaphragm secured in position by the cap and dividing the reservoir into two chambers, an air chamber vented to atmosphere through the cap, and a liquid chamber connectable to a master cylinder characterised in that an inlet port is provided in the wall of the reservoir body for initial charging of liquid into the liquid chamber without necessitating the removal of the cap and diaphragm, said port having a closure plug therein for subsequent sealing of the port after the initial charging.

Also according to this invention there is provided a method for filling and bleeding a liquid pressure control system including a reservoir as described above, and having a hydraulic master cylinder, a remote hydraulic slave cylinder connected to the master cylinder via a conduit, and said reservoir feeding the master cylinder, characterised in that the method provides for the system to be assembled with the cap and reservoir secured in place on the reservoir, vacuum is applied to the system via the reservoir inlet port and the liquid is introduced into the system through the said inlet port.

The invention will be described by way of example and with reference to the following drawings in which:

DETAILED DESCRIPTION OF THE PREFERRED EMBODIMENT

Figure 1:
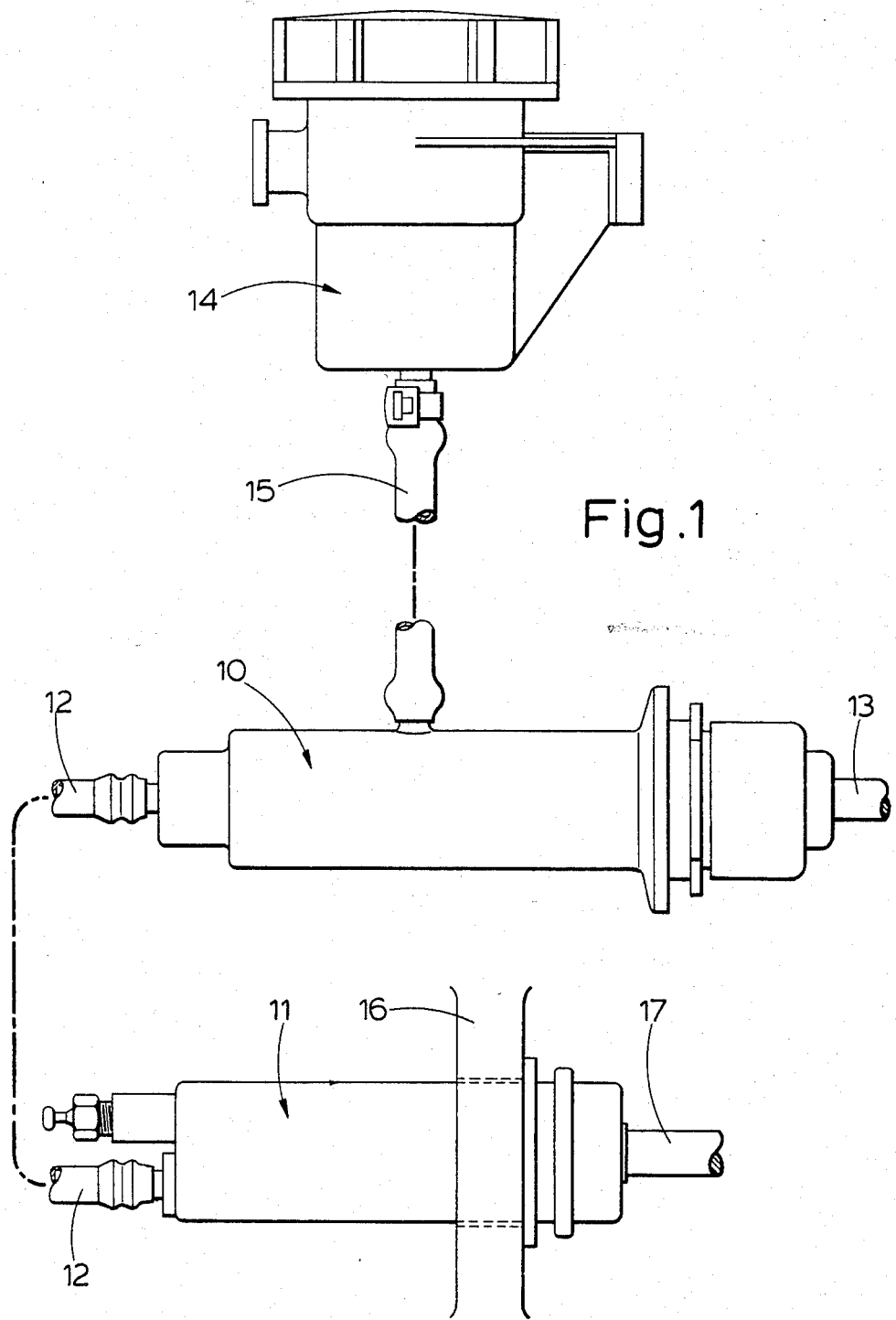
FIG. 1 illustrates a liquid pressure control system including a reservoir according to this invention.

With reference to FIG. 1 of the accompanying drawings, a liquid pressure control system for a motor vehicle clutch comprises a master cylinder 10, a remote slave cylinder 11 connected to the master cylinder 10 by a conduit 12, and a reservoir 14 that is connected to the master cylinder by a conduit 15.

Whilst the reservoir is illustrated as being remote from the master cylinder 10 it could be mounted on the master cylinder if this were required.

The master cylinder 10 is operated by a driver operable push rod 13 to produce a displacement of hydraulic fluid into the slave cylinder 11. The slave cylinder 11 is mounted on, for example, a gearbox bell housing flange 16 and its piston is displaced so as to operate a push rod 17 attached to a clutch release lever (not shown).

As the clutch driven plate (not shown) wears the push rod 17 is moved back into the slave cylinder by the release lever, thereby pushing the slave piston back into the slave cylinder and displacing excess hydraulic fluid back into the reservoir.

Figure 2:
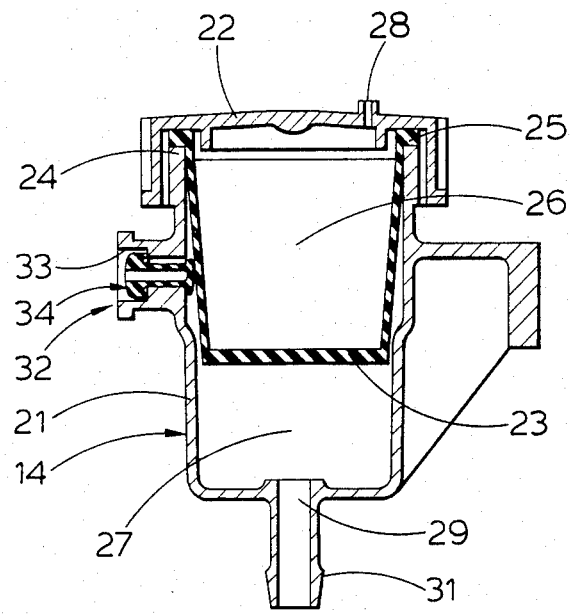
FIG. 2 is a section through a reservoir according to this invention.
Figure 3:
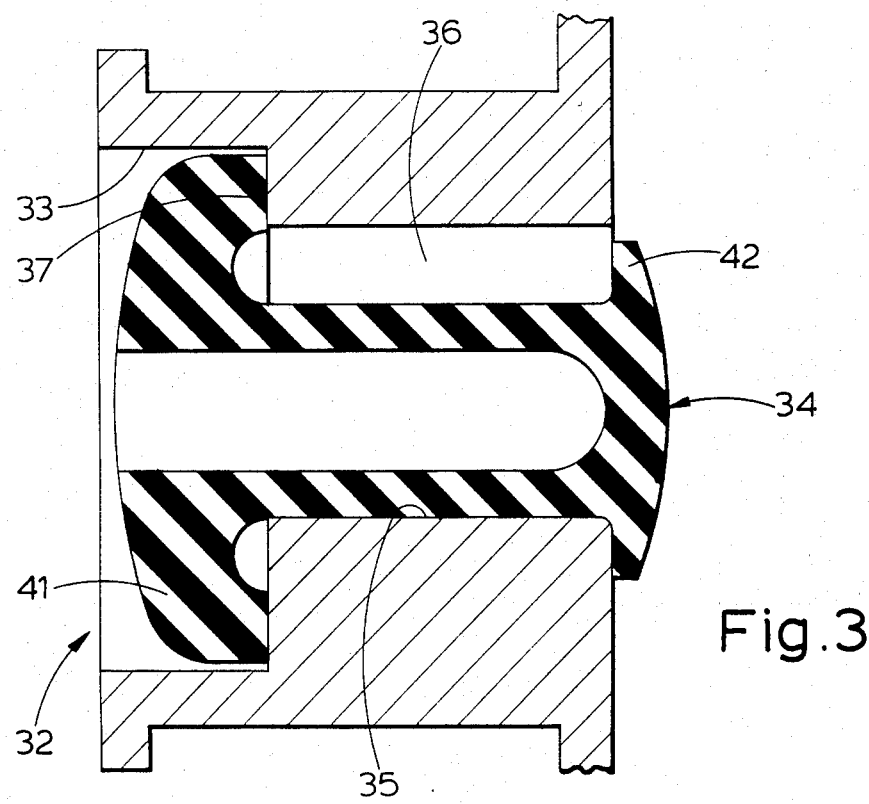
FIG. 3 is an enlarged section through a plug and port as is utilized in the reservoir shown in FIG. 2.

With reference to FIG. 2 and FIG. 3 the reservoir 14 comprises a molded polypropylene reservoir body 21 with a removable cap 22 which screws onto the mouth 24 of the reservoir body 21.

An elastomeric cup-shaped diaphragm 23 is secured in position in the reservoir by having its peripheral bead 25 trapped in the reservoir mouth 24 by the cap 22, and divides the reservoir into two chambers, an air chamber 26 and a liquid chamber 27. The air chamber 26 is vented to atmosphere via a port 28 in the cap and the liquid chamber 27 is connected to the master cylinder 10 via a port 29 which passes through a fitting 31 on the bottom of the reservoir body over which is attached the end of the conduit 16, as shown at FIG. 1.

The reservoir wall of the inlet chamber 27, FIG. 2, has an inlet port 32 therein through which during manufacture of the system the liquid chamber 27 can be filled with hydraulic fluid without necessitating the removal of the cap 22 and diaphragm 23 from the mouth 24 of the reservoir. The inlet port 32, as best shown at FIG. 3, has a stepped through bore 33, the smaller diameter portion 35 of which has grooves 36 in the wall thereof that interconnect the inlet chamber 27 with the shoulder 37 of the stepped bore 33. The bore 33 has an elastomeric plug 34 therein for subsequent sealing of the inlet port 32 after filling the reservoir 14. The plug 34 has a circular flange 41 or 42 at each respective end. The outer flange 41 seals against the shoulder 37 of the stepped bore 33, and the inner flange 42 retains the plug in the inlet port but does not close off the grooves 36. The flange 41 is therefore acted upon by hydraulic fluid in the inlet chamber 27.

The liquid pressure control system illustrated in FIG. 1 is filled with fluid after assembly of the complete system. Vacuum is applied to the system via the inlet port 32 on the reservoir 14. The vacuum is then held, and the level of vacuum monitored over a period of time, so as to check the integrity of the system. Hydraulic fluid is then introduced into the system through the inlet port 32. The fluid may be injected into the system under pressure e.g. 20 psi (1.3 bar) for a clutch system, and is drawn down into the system by the vacuum therein. Thus the system is filled without removing the screw cap 22 and diaphragm 23.

The inlet port 32 is subsequently sealed by the plug 34 being pushed into the stepped bore 33. If there is a build up of a pressure differential between the liquid within the reservoir and the atmosphere outside the reservoir, the pressure of liquid acting on the flange 41 causes it to lift away from the shoulder 37 and allows liquid to bleed out of the port 32. The pressure differential at which this occurs can be controlled by the dimensions and material of the plug.

The air chamber 26 is of sufficient volume to enable the elastomeric diaphragm to distort to accommodate changes in the volume of fluid in the liquid chamber 27 causes by the displacement of hydraulic fluid to and from the slave cylinder. During servicing of the vehicle on which the control system is fitted the volume of liquid in the chamber 27 may be unnecessarily topped up and the diaphragm 23 distorted on replacement. In such circumstances as the clutch plate wears and fluid is displaced back into the reservoir 14 then the plug 34 allows excess fluid to be vented out of the reservoir. This prevents build up of hydraulic pressure in the system and prevents clutch slip.

Whilst the invention has been described with reference to a clutch control system, it is obvious that such a reservoir could be utilized in hydraulic brake systems which are vacuum bled. In this case the fluid would be injected in through the inlet port at a pressure of 200 psi (13 bars).

I claim:

1. A hydraulic fluid reservoir for a hydraulic control system, said system comprising a master cylinder and a remote slave cylinder connected to the master cylinder by a conduit, said reservoir being connected to said master cylinder and comprising a body having a mouth, a detachable cap mounted on the mouth of the body and removable for replenishing the reservoir with hydraulic fluid through said mouth, a flexible diaphragm secured in position by said cap and also removable for replenishing the reservoir with hydraulic fluid, said diaphragm dividing the reservoir into two separate and non-communicating chambers, one of said chambers being an air chamber below said cap vented to atmosphere through an aperture in the cap and the other of said chambers being a chamber below said diaphragm for containing hydraulic fluid and connectable to the master cylinder, an inlet port defined in a wall of the reservoir body for initial charging of hydraulic fluid into the other of said chambers without necessitating the removal of the cap and diaphragm, and a non-removable closure plug located in the inlet port for subsequent sealing thereof after the initial charging, wherein the inlet port and the closure plug are so constructed and arranged as to allow excess hydraulic fluid in the other of said chambers to exit therefrom past the closure plug when a predetermined pressure differential exists across the closure plug and as to prevent ambient air from being introduced to said other of said chambers, and wherein said initial charging of hydraulic fluid is effected through said port by connecting said port to a source of vacuum with said closure plug removed, disconnecting said port from said source of vacuum, connecting said port to a source of said hydraulic fluid and placing said plug in said port.

2. A reservoir as claimed in claim 1, wherein the closure plug is made of elastomeric material and has two circular flanges located one at each end thereof, the inner flange retaining the closure plug in the inlet port, and the outer flange sealing the inlet port and being exposed on one side to the hydraulic fluid in the reservoir through a longitudinal groove in the inlet port.

3. The reservoir of claim 1 wherein said diaphragm is made of elastomeric material and is cup-shaped.

4. The reservoir of claim 2 wherein said diaphragm is made of elastomeric material and is cup-shaped.

* * * * *

UNITED STATES PATENT AND TRADEMARK OFFICE
CERTIFICATE OF CORRECTION

PATENT NO. : 4,506,507
DATED : March 26, 1985
INVENTOR(S) : Maurice John Wimbush It is certified that error appears in the above–identified patent and that said Letters Patent are hereby corrected as shown below:

Col. 3, line 24, change "causes" to --caused--.

Signed and Sealed this

Sixteenth Day of July 1985

[SEAL]

Attest:

DONALD J. QUIGG

Attesting Officer     Acting Commissioner of Patents and Trademarks